United States Patent Office 3,542,711
Patented Nov. 24, 1970

3,542,711
PROCESS FOR PREPARING POLYEPOXIDE/THERMOPLASTIC RESIN FLUIDIZED BED COATING COMPOSITIONS AND RESULTING PRODUCTS
Joseph P. Manasia, Union, and Roy A. Allen, Iselin, N.J., assignors to Shell Oil Company, New York, N.Y., a corporation of Delaware
No Drawing. Continuation-in-part of application Ser. No. 459,421, May 27, 1965, which is a continuation-in-part of application Ser. No. 332,943, Dec. 23, 1963. This application Nov. 6, 1967, Ser. No. 680,960
The portion of the term of the patent subsequent to Jan. 9, 1984, has been disclaimed
Int. Cl. C08f 19/14, 21/04; C08h 9/00
U.S. Cl. 260—23
9 Claims

ABSTRACT OF THE DISCLOSURE

Homogeneous epoxy/thermoplastic agglomerates which are suitable for use in fluidized bed processes are prepared by pulverizing (1) a polyepoxide resin, (2) at least one thermoplastic resin, (3) a benzophenone tetracarboxylic dianhydride and (4) a stannous salt of a monocarboxylic acid in a pebble mill containing high density grinding media.

BACKGROUND OF THE INVENTION

This application is a continuation-in-part application of copending application Ser. No. 459,421, filed May 27, 1965, now U.S. 3,362,922 issued Jan. 9, 1968, which was a continuation-in-part of application Ser. No. 332,943, filed Dec. 23, 1963 now U.S. 3,344,096 issued Sept. 26, 1967.

It is extremely important in fluidized bed coating processes to utilize a coating composition which is not only ground to a desirable size-range but also does not segregate into the respective diverse ingredients upon standing. It is known that coating compositions prepared by grinding in ball mills using balls and pebbles are powders which to a greater or lesser degree segregate upon standing, presumably due to the different specific gravities and particle sizes of the various components. Such segregation causes wide and undesirable variations in the film properties of the final cured fluidized coating composition.

It was found that extended milling of certain polyepoxide compositions with certain types of grinding media, i.e., high density media, agglomerates the diverse ingredients of the formulation into homogeneous composites which do not segregate. The curing films prepared from polyepoxide compositions prepared by this milling method have excellent predictable physical properties. This novel process is described in copending patent application Ser. No. 459,421, filed May 27, 1965.

It has been found that the milling process can be effectively utilized when a substantial part of the polyepoxide is replaced with one or more thermoplastic resins. While the resulting compositions do not in generally cure as rapidly as the polyepoxide compositions, they are significantly less expensive. It has thus been discovered that the instant fluidizable polyepoxide/thermoplastic compositions exhibit all the desirable characteristics of both the polyepoxide resins and the thermoplastic resins while still curing at an acceptable rate. Also, the compositions do not segregate upon storage. In other words, the agglomerated cross-link polyepoxide/thermoplastic resin products prepared by the present process possess the superior adhesion properties of the polyepoxide resins as well as outstanding flexibility and impact resistance.

It is therefore the primary object of the present invention to provide a dry blending process for preparing flexible, rapid curing, fluidizable polyepoxide/thermoplastic coating compositions which agglomerates the diverse ingredients of the formulation into homogeneous powder composites which do not segregate. Other objects will become apparent to one skilled in the art from the following detailed description.

SUMMARY OF THE INVENTION

The present invention is directed to a process for preparing homogeneous fluidizable coating compositions which comprises pulverizing (1) a polyepoxide having a vic epoxy equivalency greater than 1.0, (2) at least one thermoplastic resin, (3) a benzophenone tetracarboxylic dianhydride and (4) a stannous salt of a monocarboxylic acid, particularly a fatty acid containing from about 5 to about 20 carbon atoms in the molecule, in a pebble mill containing high density media as the essential grinding media.

Generally, the components are added, in any order, to the pebble mill which already contains the grinding media charge. After charging, the pebble mill is run for a sufficient time to assure proper particle agglomeration and film flow. The time period required for agglomeration is dependent on (1) the size of the pebble mill used, (2) the rotational speed of the mill and (3) the volume ratio of media to formulation components. The time period in the mill required for the proper film flow to be developed is very much dependent on the type of grinding media used (i.e., size, shape and media density). In general, the volume ratio of grinding media to total mill volume can be varied considerably depending upon the above-noted factors; however, such a ratio is usually between about 25% and 75% with about 50% being an especially good ratio. Upon termination of the grinding period, the powder is discharged and without further treatment is ready for use.

It will be appreciated that the present one-step process utilizing a pebble mill and high density media not only provides a single process for pulverizing the ingredients into a fine powder but also envelops each individual particle of the powder with a uniform coating of a liquid catalyst and agglomerates such catalyst-treated particles with the curing agent into homogeneous composites which do not segregate.

The benzophenone tetracarboxylic dianhydrides which may be employed in the present invention have the following structural formula:

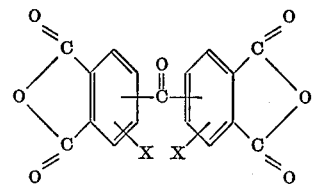

wherein X represents hydrogen, halogen, —NO₃, —COOH, —SO₃H or —NH₂ and may be the same or different radical.

Representative benzophenone tetracarboxylic dianhydrides include, among others 3,3',4,4'-benzophenone tetracarboxylic dianhydride; 2-bromo-3,3',4,4'-benzophenone tetracarboxylic dianhydride; 2-carboxy-2'-sulfo-3,3',4,4'-benzophenone tetracarboxylic dianhydride; 2-amino-2,3', 4,4'-benzophenone tetracarboxylic dianhydride; and 5-nitro-2,3',3,4'-benzophenone tetracarboxylic dianhydride.

These dianhydrides may be prepared by oxidizing appropriate aryl compounds with nitric acid. In general, a nitric acid concentration of from about 5% to about 70% is employed and the amount may range from about 8.0 to about 17.0 on a molar ratio of 100% nitric acid relative to the aryl compound. The oxidation time can range from a few minutes to 2 or more days with from about 10 minutes to 2 hours generally employed. Temperatures of about 110° C. to about 350° C., with 150° C. to 250° C. being preferred, are employed. Since the oxidation reaction is preferably conducted in the liquid phase, pressures from about atmospheric to 500 pounds per square inch or higher are utilized. Upon completion of the oxidation reaction, the reaction mixture is allowed to cool, preferably down to about room temperature whereupon the reaction product precipitates out after from about 2 to 24 hours. These crystals of product are then separated from the liquid by any suitable means such as by filtration. The dried crystals are the dianhydrides utilized in the present compositions.

The aryl compounds which may be employed to produce the benzophenone tetracarboxylic dianhydrides of the present invention may be represented by the general structural formula:

wherein Ar represents the same or different aryl radicals containing one or more rings and wherein at least one is an aromatic ring attached directly to the carbon atom in said formula, such as phenyl, biphenyl, naphthyl, phenanthryl, anthryl, indyl, dihydronaphthyl and cyclohexylphenyl, said radicals carrying as nuclear substituents at least two radicals defined by $R_1$, said latter radicals being located at least two positions away from said carbon in the formula; and $R_1$ is selected from the group consisting of primary, secondary and tertiary alkyls having from one to 16 carbon atoms, such as methyl, ethyl, n-propyl, isopropyl, isobutyl, amyl, isoamyl, isooctyl, decyl, tetradecyl, hexadecyl and the like. The remaining positions on the aromatic rings can include radicals such as said diverse radicals defined hereinabove as well as alkyl groups having from one to 10 carbon atoms. It is critical in order to obtain the anhydrides useful in the present compositions that the nuclear substituents on the aromatic rings, defined above by $R_1$, be located at least two positions away from the carbon in the structural formula immediately above, otherwise the compounds produced will not be anhydrides but could be lactones.

Suitable aryl compounds which may be oxidized to produce dianhydrides useful in the present composition include, among others, 1,1' - bis(3,4,3',4' - tetramethylphenyl)ethane, 1,1 - bis(2,2' - dibromo - 3,4,3',4' - tetramethylphenyl)ethane, 1 - (3 - methyl - 4 - ethylphenyl) - 1,2'-nitro - 3',4' - diethylphenyl)ethane, 1,1 - bis(3,4,3',4'-tetramethyl - 5 - aminophenyl)ethane, 1,1 - bis(3 - ethyl-4 - butylphenyl)isobutane, 1 - (3,4 - diethylphenyl) - 1-3'4' - diisopropylphenyl)ethane, 1,1 - bis(3,4,3',4' - tetramethylphenanthryl)ethane, 1 - (3 - methyl - 4 - isopropylnaphthyl), 1-3',4'-diethylanthryl)ethane, etc.

The preferred aryl compound is di-ortho-xylylethane, which when oxidized with nitric acid at about 200° C. yields 3,3',4,4'-benzophenone tetracarboxylic dianhydride.

The polyepoxide materials used in preparing the composition of the present invention comprise those organic materials which have more than one vic-epoxy group, i.e., more than one

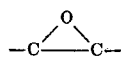

group, which group may be in a terminal position, i.e., a

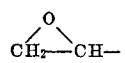

group or in an internal position, i.e., a

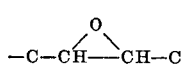

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4 - bis(2,3 - epoxypropoxy)benzene, 1,3 - bis(2,3 - epoxypropoxy)benzene, 4,4' - bis(2,3 - epoxypropoxy)diphenyl ether, 1,8 - bis(2,3 - epoxypropoxy)octane, 1,4-bis(2,3 - epoxypropoxy)cyclohexane, 4,4' - bis(2 - hydroxy - 3,4'-epoxybutoxy)diphenyl dimethylmethane, 1,3-bis(4,5 - epoxypentoxy - 5 - chlorobenzene, 1,4 - bis(3,4-epoxybutoxy) - 2 - chlorocyclohexane, 1,3 - bis(2 - hydroxy - 3,4 - epoxybutoxy)benzene, 1,4 - bis(2 - hydroxy-4,5-epoxypentoxy)benzene.

Other examples include the epoxy polyethers of polyhydric phenols with a halogen-containing epoxide or dihalohydrin in the presence of an alkaline medium. Polyhydric phenols that can be used for this purpose include, among others, resorcinol, cathechol, hydroquinone, methyl resorcinol, or polynuclear phenols, such as 2,2-bis(4-hydroxyphenyl)propane (Bisphenol A), 2,2-bis(4-hydroxyphenol)butane, 4,4'-dihydroxybenzophenone, bis(4-hydroxynaphthalene. The halogen-containing epoxides may be further exemplified by 3-chloro-2,3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxypolyethers obtained by reacting, preferably in the presence of an acid-acting compound, such as hydrofluoric acid, or one of the aforedescribed halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)-dimethylmethane and the like.

The preparation of suitable such polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut, and dehydrated castor oil, methyl linoleate, butyl linolinate, ethyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)oxalate, di(2,3-epoxyhexyl)succinate, di(2,3-epoxyoctyl)tetrahydrophthalate, di(4,5 - epoxydodecyl)maleate, di(2,3-epoxybutyl)terephthalate, di(2,3 - epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3 - epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3 - epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3 - epoxycyclohexanoate), glycerol tri(2,3-epoxycyclohxanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13 - diepoxyeicosanedioate, dibutyl 7,8,11,12 - diepoxyoctadecanedioate, dioctyl 10,11 diethyl-8,9,12,13 - diepoxyeicosanedioate, dicyclohexyl 3,4,5,6 - diepoxycyclohexanedicarboxylate, dibenzyl 1,2,4,5 - diepoxycyclohexane - 1,2 - dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13 - eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene acrylonitrile copolymers (Hycar rubbers), butadiene styrene copolymers and the like.

Still another group includes the epoxidized hydrocarbons such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight above 500, as for example, between about 800 and 1,500 and between about 2,700 and 3,100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as are the Polyethers D and E, noted above, or may be a blend of resins in which one of them is a liquid grade, such as, a polyepoxide having an epoxy equivalent weight of between 225 and 290 and an average molecular weight of between 450 and 500 as represented by Polyether A. Thus, a suitable mixture of polyepoxides is a mixture containing between 60% by weight of a solid polyepoxide derived from an epichlorohydrin and 2,2-bis(4-hydroxyphenyl)propane having an epoxy equivalent weight of between 1,650 and 2,050 and an average molecular weight of between 2,700 and 3,100 (see, for example, U.S. 2,633,458, column 6, line 74 to column 7, line 9) and between 40% and 20% by weight of a liquid polyepoxide derived from an epihalohydrin and diphenylol propane having an epoxy equivalent weight of between 175 and 210, and an average molecular weight of between 350 and 400 (Polyether A).

The polyepoxide may also be a blend of solid resins, and preferably a blend of a resin having a melting point higher than 100° C., and preferably a resin having a melting point below 80° C., and preferably a resin having a melting point in the range of 60–80° C., the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxy equivalent weight of between 1,650 and 2,050, and a melting point of between 120 and 160° C. and between 50 and 70% by weight of a solid polyepoxide derived from an epihalohydrin and diphenylol propane having an epoxy equivalent weight of between 450 and 525, and a melting point between 60 and 80° C. (Polyether D).

In general, any polymer that can be "thermoplastic" is suitable for use in the present invention. By "thermoplastic" is means those polymers which melt when heated, say to temperature above 200° F. A great variety of different materials are included in this group, such as, for example, polymers of ethylenically unsaturated monomers, certain alkyd type resins, i.e., reaction products of polybasic acids and polyhydric alcohols, certain polyurethanes, certain polycarbonates, cellulose derivatives, certain phenolic resins, vinyl polymers, acrylic polymers, and polyamides such as nylon.

Particularly preferred materials to be utilized comprise the polymers of the ethylenically unsaturated monomers. This includes the homopolymers, copolymers, terpolymers, graft copolymers and block copolymers, as well as blends and mixtures of two or more polymeric materials as well as blends of the polymers with other materials such as wax. This includes, among others, polymers and copolymers of monomers such as ethylene, propylene, butylene, isobutylene, octene, styrene, alpha-methylstyrene, dichlorostyrene, vinyl naphthalene, vinyl phenol acrylic acid, methyl methacrylate, ethyl acrylate, butyl acrylate, vinyl acetate, vinyl butyrate, vinylidene chloride, vinyl chloride, vinyl bromide, acrylonitrile, methacrylonitrile, vinyl benzoate, allyl chloride, allyl acetate, allyl benzoate, vinyl laurate, vinyl stearate, vinyl methyl succinate, allyl butyl phthalate, divinyl succinate, diallyl phthalate, crotyl amyl phthalate, diallyl isophthalate, diallyl terephthalate, ethylene glycol diacrylate, vinyl ethyl ether, vinyl butyl ether, vinyl butyl ketone, allyl amine, vinyl pyrrolidone, vinyl pyridine, acrylamide, N-ethyl acrylamide, and the like, and mixtures thereof with the above-noted monomers.

Especially preferred polymers include the homopolymers and copolymers of monomers having a single ethylenic group, and preferably a single

group, and especially the alpha-olefins, such as ethylene, propylene, isobutylene and the like, and their copolymers and interpolymers.

The above-described polymers of the unsaturated monomers can be prepared by conventional techniques including the aqueous emulsion, suspension, solvent or bulk systems using catalyst systems such as free radical catalysts, Ziegler catalysts and the like. The superior properties and results are most in evidence, however, when one utilizes the high crystalline polymers obtained by the use of the so-called Ziegler catalysts. These catalysts consist broadly of two-component systems comprising a compound of Groups 4b, 5b, 6b or 8 of the Periodic Table of the Elements, as illustrated on pages 448 and 449, Handbook of Chemistry and Physics, The Chemical Rubber Publishing Corp., 44th edition, 1962, and a Group 1a, 2a or 3a element or alloy or hydride or organic derivative having an organometallic bond. Suitable catalysts are described in the reference listed on pages 350 to 361 of "Linear and Stereoregular Addition Polymer," by Gaylord and Mark, Interscience Publishers, Inc., New York (1959). Since stereoregular polypropylenes are now well known materials of commerce, their preparation need not be further detailed here. The common stereoregular form of the polyolefins is that known as isotactic.

Other preferred thermoplastic polymers include the so-called synthetic plastics such as hte polyamides, i.e., nylon, as well as the polyesters prepared from terephthalic acid and ethylene glycol (Terylene® and Dacron®); polymers and copolymers of acrylonitrile such as polyacrylonitrile (Orlon®), copolymers of acrylonitrile and vinyl chloride (Cynel®), and vinyl acetate-modified polyacrylonitrile (Acrilan®); and the cellulose esters and mixed esters such as cellulose acetate, cellulose acetate propionate and cellulose acetate butyrate.

Of special importance are the nylons. Nylon as used herein is deemed to be the generally accepted usage of the term, i.e., the generic term for a class of polyamides containing separating amide groups (—CONH—), connected by methylene units (—$CH_2$—) in the polymer structure. The nylons are prepared by condensing a diamine with a dibasic acid. With the variety of diamines and dibasic acids available, many different types of nylons are possible. In general, all polyamides which are customarily called "nylon" are suitable for use in the present invention. The most common types in commercial use today are nylon 6, nylon 66 and nylon 610. These numbers represent a convenient method of designating the nylons according to the number of carbon atoms in the segments of the starting diamine and dibasic acid from which they are made. For example, nylon 66 is made from hexamethylenediamine and adipic acid, both of which contain 6 carbon atoms. Nylon 6 uses caprolactam, a cyclic acid amide $NH(CH_2)_5CO$ which contains 6 carbon atoms as its starting material. Nylon 610 is made from hexamethylenediamine and sebacic acid which contains 10 carbon atoms.

Stannous salts which are especially suitable for catalyzing the present compositions are the stannous salts of monocarboxylic acids having at least 5 carbon atoms, preferably fatty acids containing from about 5 to about 20 carbon atoms and more preferably from about 6 to 12 carbon atoms. Suitable stannous salts include, among others, stannous caproate, stannous octoate, stannous laurate, stannous palmitate, stannous stearate, stannous oleate, and stannous naphthenate. Stannous octoate is particularly preferred because it promotes exceptionally rapid cures and imparts outstanding flexibility as well as high impact strength and solvent resistance to the cured films and molding compositions. The stannous salt catalyst is beneficially employed in concentrations from about 0.1 to 5 parts per one hundred parts of polyepoxide.

Suitable fillers which may be employed as desired, include, among many others, aluminum powder, mica, bentonites, clays, synthetic resins and elastomers, ignited $Al_2O_3$, short-fiber asbestos, wood flours, carbon black, silica, zinc dust, talc and the like. A large number of fillers are available commercially in particle sizes from about 0.1 micron upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranges from about 10 to about 60 phr.

It is generally desirable, although not necessary, to employ a thixotroping agent to prevent dripping or sagging at high film build. Any of the thixotroping agents normally used in the art are suitable for use in the present compositions, including silica aerogels, bentonite clays and their derivatives, castor oil derivatives and the like.

The proportion of the polyepoxide, thermoplastic resin, benzophenone dianhydride curing agent, fillers, catalysts, thixotroping agents and other additives will vary with wide ranges. Although benzophenone dianhydride is generally employed as a curing agent, its use can be eliminated for some applications, such as, for example, when the thermoplastic resin contains free carboxyl groups, i.e., irradiated polyethylene.

In general, however, rapid cure, excellent film flexibility, excellent adhesion and impact resistance is achieved when the final composition comprises from about 5 to 50 parts by weight of polyepoxide; from about 50 to 95 parts by weight of thermoplastic resin; from about 1 to 20 parts by weight of benzophenone tetracarboxylic dianhydride; from about 0.1 to 5 parts per one hundred parts by weight of polyepoxide of a stannous salt of a monocarboxylic acid; and, optionally, from about 5 to 50 parts by weight of filler.

A particularly good composition prepared by the present process possessing outstanding flexibility, solvent resistance when cured in 5 minutes, generally 2 minutes, or less at a temperature range of from 450–500° F. comprises from about 5 to 25 parts by weight of a glycidyl polyether of 2,2-bis(4-hydroxyphenyl)propane having a molecular weight of from about 900 to about 1500, an epoxide value of from about 0.10 to 0.20 eq./100 g., and a hydroxyl value of from about 0.32 to 0.35 eq./100 g.; from about 65 to 80 parts by weight of nylon; from about 1 to 10 parts by weight of 3,3′,4,4′-benzophenone tetracarboxylic dianhydride; and from about 0.5 to 3.0 parts per one hundred parts by weight of the polyepoxide of stannous octoate.

Another particularly good composition having excellent flexibility and rapid curing properties can be prepared by the present process when the polyepoxide in the above composition is a glycidyl polyether of 2,2-bis(4-hydroxyphenyl)propane having an epoxy value of about 0.05 eq./100 g., a molecular weight of about 2,900 and a melting point of from about 127–133° C. by Durrans' Mercury Method.

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated, it should, of course, be completely immersed in the fluidized bed. The article is preferably moved backwards and forwards in the bed, over a period of time determined by the desired thickness of coating. For the production of thin coating, i.e., less than 0.015 inch thick, the period during which an article is dipped or immersed into the bed is usually less than three seconds.

After the article has been in contact with the fluidized bed for the desired time, it is removed, excess powder adhering to the article is preferably removed, and the coating cured by heating to at least 125° C., and preferably between 150 and 275° C.

The compositions of the instant invention may also be sprayed as by a compressed air spray gun or electrostatically, i.e., by maintaining a difference in electrostatic charge between the particles and the article to be coated.

A feature of the present invention is the utilization of high density grinding media. The high density grinding media may be spherical or cylindrical in shape with cylindrical media being preferred. The spherical media may range from about ¼ inch in diameter to 2 or more inches in diameter with a preferred diameter of from about ½ to 1½ inches in diameter. In general, the cylindrical media may range from about ½ inch in diameter to 2 or more inches in diameter with the preferred diameter being in the range of from ¾ inch to 1½ inches in diameter. The ratio of height to diameter of the cylinders may range from about 0.5:1 to about 3:1 with a 1:1 ratio being preferred. The term "high density" as used herein means a density which is at least 25% greater than porcelain and preferably at least 40% greater than porcelain. The density of the grinding media may be expressed in terms of specific gravity based on water as 1.0. Thus, the term "high density" as used herein means that the grinding media has a specific gravity of at least 2.75 and preferably greater than 3.5. The grinding media may be metallic, semi-metallic or non-metallic. In general, non-metallic media is preferred although metallic grinding media such as steel, may be used in applications where metallic contamination is not a limiting consideration.

The volume ratio of media to formulation components may vary through a wide range with a ratio of from about 1:1 to about 5:1 being usually employed. Very good results are obtained when the weight ratio of media to components is from about 1:1 to about 10:1 with a ratio of about 5:1 to 10:1 being preferred.

As noted hereinbefore, the time required to assure proper agglomeration and film flow is dependent on many factors. Under the precise conditions set forth in Example I which follows, the pulverized composition is ready for use after about 6 hours. It is generally preferred to screen the product to pass 100% through an 80 to 100 mesh screen.

While the polyepoxide may be added to the pebble mill in flake or lump form, i.e., without pregrinding, it is generally preferred to pregrind the polyepoxide to approximately 20 mesh.

It is generally desirable, however, to utilize thermoplastic resin particles having a particle size of 100 mesh or smaller and preferably less than about 200 mesh.

The invention is illustrated by the following examples. The reactants, their proportions and other specific ingredients of the formulations are presented as being typical and various modifications can be made in view of the foregoing disclosure without departing from the spirit or scope of the disclosure of the claims. Unless otherwise specified, parts and percentages disclosed are by weight.

EXAMPLE I

A rapid curing fluidizable composition was prepared from the following components:

| | Parts by weight |
|---|---|
| Opex 77 (an irradiated polyethylene available from W. R. Grace Company, Polymer Division and contains carboxyl groups at a concentration of 0.18 meq./g., equivalent to a weight per carboxyl of 5550 g.) | 84.88 |
| Polyepoxide (a glycidyl polyether of 2,2-bis (4-hydroxyphenyl) propane having a melting point of 98° C., a molecular weight of 1400 and an epoxide value of 0.103 eq./100 g.). | 14.40 |
| Stannous octoate | 0.72 |
| | 100.00 |

The carboxyl/epoxide ratio was 1:1. The polyethylene particles had an average particle size of 75 to 150 microns. The polyepoxide was preground to approximately 20 mesh. 800 gms. of the above formulation was added to a P. O. Abbe, Inc. jar mill having a capacity of 1½ gallons and containing 5550 gms. of "Borundum" high density (3.65 sp. gr.) cylindrical grinding media 1³⁄₁₆" x 1³⁄₁₆" O.D. (manufactured by U.S. Stoneware Company). After charging, the mill was run at a peripheral speed of 42 feet/minute for 24 hours. On completion of grinding, the powder was discharged from the mill.

The film properties of the cured composition were determined using a particle size distribution smaller than 80 mesh, i.e., 100% passed 80 mesh.

Sprayability was determined visually. A solvent-cleaned 1½" x 6", 20 gauge, cold rolled steel panel was heated on a carefully controlled hot plate to the proper cure temperature. A stream of the powder was directed at the panel with a Binks Model 171 Flocking Gun (OB-11 nozzle). The panel was allowed to remain on the hot plate for the cure cycle.

The film flow, film continuity and film appearance were evaluated visually. The film continuity was further evaluated with the Bird Dog Holiday Detector, a high sensitive, wet sponge device for locating defects in protective coatings. A maximum of 30.0 volts was applied to the coated surface.

To evaluate the flexibility, a solvent-cleaned 1½" x 6", 20 gauge, cold rolled steel panel was heated to the cure temperature. A 10–15 mil film of the coating was sprayed on the panel. After the cure cycle was completed, the panel was removed and allowed to cool to room temperature for a period in excess of 20 minutes. The panel was then bent over a 1 inch diameter mandrel. The angle at which the first crack appears was recorded as the measure of flexibility.

Reverse impact, Substrate Adhesion, and Heat Resistance were determined as follows:

A solvent-cleaned, 1½" x 6", 20 gauge, cold rolled steel panel was heated to 450° C. A 6–8 mil film of the coating was sprayed on the panel. After a ten-minute cure cycle at 480–500° F., the panel was removed and allowed to cool to room temperature for a period in excess of 20 minutes.

(1) Reverse Impact: The coated side of the panel is centered, coated side down, on the anvil of a Gardner Impact Tester and impacted. The impact resistance is recorded as the number of inch pounds required to shatter the film.

(2) Substrate Adhesion: A sharp pointed blade is passed through the coating until it reaches the metal-coating interface. At that point the experimenter attempts to separate the coating from the metal. If the coating is not cleanly removed from the metal then the adhesion is judged adequate. On the other hand, if the coating is removed leaving a clean metal surface then the adhesion is judged to be of poor quality.

(3) Heat Resistance: Visual observation for film discoloration.

The film properties of the above-cured compositions were as follows:

(a) cure schedule: 10 minutes at 450° F.
(b) sprayability at 450° F.: satisfactory
(c) film flow: satisfactory
(d) film continuity: satisfactory
(e) film appearance: satisfactory
(f) substrate adhesion: very good
(g) flexbility: greater than 180°
(h) impact (reverse): >160 inch/lbs.

EXAMPLE II

The procedure of Example I was substantially repeated wherein the following composition was employed:

| Component: | Parts by weight |
|---|---|
| Nylon, powdered | 74.7 |
| Polyepoxide (a glycidyl polyether of 2,2-bis(4-hydroxyphenyl)propane having a melting point of 82° C., an approximate molecular weight of 106° and an epoxide equivalent weight of about 650 | 20.0 |
| 3,3′,4,4′ - benzophenonetetracarboxylic dianhydride (BPDA) | 5.1 |
| Stannous octoate | 0.2 |
| | 100.00 |

The cure schedule was 2 minutes at 490–500° F.

The film properties of those cured compositions were as follows:

(a) sprayability at 490–500° F.: satisfactory
(b) film flow: satisfactory
(c) film continuity: satisfactory
(d) film appearance: satisfactory
(e) substrate adhesion: excellent
(f) flexibility: >180°
(g) impact (reverse): passed 70 inch/lbs.—failed 80 inch/lbs.

EXAMPLE III

The procedures of Example I were substantially repeated using the compositions of Example I. This procedure was then repeated wherein the 14.40 parts of polyepoxide were replaced with 14.40 parts of Opex 77. Thus one formulation contained only polyethylene (Coating A) and then the other contained polyethylene/polyepoxide (Coating B).

Thirteen to fifteen mil films were applied on cold roll steel substrates and cured for 15 minutes at 490° F. using both compositions.

The results are tabulated as follows:

| | Composition | |
|---|---|---|
| Film Property: | A | B |
| (a) Sprayability at 450° F | Satisfactory | Satisfactory. |
| (b) Film flow | do | Do. |
| (c) Film continuity | do | Do. |
| (d) Film appearance | do | Do. |
| (e) Substrate adhesion | Poor | Good. |
| (f) Flexibility (1″ mandrel) | Failed 15° | >180°. |
| (g) Impact (reverse) | Failed 20″/lbs | 160″/lbs. |
| (h) Heat resistance | Severe film discoloration. | No film discoloration. |

EXAMPLE IV

The procedures of Example II were substantially repeated using the compositions of Example II. This procedure was then repeated wherein the 20.0 parts of polyepoxide were replaced with 20.0 parts of nylon powder. Thus one formulation contained only nylon (coating A) and the other contained nylon/polyepoxide (coating B).

Thirteen to fifteen mil films were applied on cold roll steel substrates and cured for 2 minutes at 490–500° F. using both compositions.

The results are tabulated as follows:

| | Composition | |
|---|---|---|
| Film Property: | A | B |
| (a) Sprayability at 490° F | Satisfactoryg | Satisfactory. |
| (b) Film flow | do | Do. |
| (c) Film continuity | do | Do. |
| (d) Film appearance | do | Do. |
| (e) Substrate adhesion | Poor | Excellent. |
| (f) Flexibility (1″ mandrel) | Complete loss of adhesion on flexing. | >180°. |
| (g) Impact (reverse) | Complete loss of adhesion on impact. | Passsd 80 in./lbs. |
| (h) Heat resistance | Moderate film discoloration. | No film discoloration. |

EXAMPLE V

The procedure of Example II was substantially repeated wherein various amounts of polyepoxide, nylon powder, and benzophenone dianhydride are employed. The results are tabulated in Table I.

TABLE I.—PROPERTIES AND PERFORMANCE OF EPOXY-MODIFIED NYLON POWDER COATING COMPOSITIONS

| | Control | 1 | 2 | 3 | 4 | 5 |
|---|---|---|---|---|---|---|
| Wt. ratio of nylon:[1] polyepoxide.[2] | 100:0 | 95:5 | 90:10 | 80:20 | 80:20 | 80:20. |
| BPDA [3] (percent stoich.) | | 100 | 100 | 100 | 50 | 25. |
| Grinding | | OK | OK | OK | OK | OK. |
| Compatibility | OK | OK | OK | OK | OK | OK. |
| Sprayability | Fair | Fair, better than control. | Fair, better than control. | Fair, better than control. | Fair, better than control. | Fair, better than control. |
| Surface appearance | Slightly glossy, v. slight orange peel. | Glossier than controls, slight yellowing, increased orange peel. | Slightly glossy, increased yellowing, increase in orange peel. | Slightly glossy, increased yellowing, increase in orange peel. | Slightly glossy, decrease in yellowing, decrease in orange peel. | Slightly glossy, decrease in yellowing and orange peel. |
| Flexibility, ⅛ in. mandrel | >180, complete loss of adhesion. | >180, slight loss of adhesion. | >180, no loss of adhesion. | >180, no loss of adhesion. | Failed 80, no loss of adhesion. | Failed 10, no loss of adhesion. |
| Tukon KHN (hardness) | 5.2 | 8.5 | 11.9 | 16.5 | 12.5 | 8.5. |
| Adhesion to substrate | Poor | Excellent | Excellent | Excellent | Excellent | Excellent. |
| Film thickness | 15 mils | 15 mils | 15 mils | 15 mils | 15 mils | 15 mils. |

[1] NCA-77-Nation 10 is a low molecular weight powder coating grade nylon obtainable from Polymer Process Company, Reading, Pennsylvania.
[2] A glycidyl polyether of 2,2-bis(4-hydroxyphenyl)propane having a melting point of about 80° C., an average molecular weight of about 1060 and an epoxide equivalent weight of about 650.
[3] 3,3′,4,4′-benzophenone tetracarboxylic dianhydride.

We claim as our invention:

1. A one-step process for preparing homogeneous fluidizable polyepoxide coating compositions which comprises pulverizing (1) a polyepoxide having a vic-epoxy equivalency greater than 1.0, (2) at least one thermoplastic resin, (3) a benzophenone tetracarboxylic dianhydride and (4) a stannous salt of a monocarboxylic acid in a pebble mill containing cylindrical high density media having a specific gravity of at least 2.75 as the grinding media.

2. A process as in claim 1 wherein the polyexopide is a glycidyl polyether of a polyhydric phenol.

3. A process as in claim 1 wherein the composition additionally comprises from 5 to 50 parts by weight of an inert filler.

4. A process as in claim 1 wherein the stannous salt is a salt of a fatty acid containing from 5 to 20 carbon atoms in the molecule.

5. A process as in claim 1 wherein the components are pulverized for a time sufficient to obtain the required particle agglomeration and film flow.

6. A process as in claim 5 wherein the components are pulverized for at least five hours.

7. A process as in claim 1 wherein the weight ratio of grinding media to components is from 10:1 to 1:1.

8. A process as in claim 1 wherein the thermoplastic resin is a polyamide containing separating amide groups connected by methylene units.

9. A process as in claim 1 wherein the thermoplastic resin is polypropylene.

References Cited

UNITED STATES PATENTS

| | | | |
|---|---|---|---|
| 3,106,769 | 10/1963 | Goethe et al. | 117—21 |
| 3,183,113 | 5/1965 | Gemmer | 117—21 |
| 3,259,559 | 7/1966 | Schneble et al. | 117—21 |
| 3,344,096 | 9/1967 | Manasia et al. | 260—18 |
| 3,362,922 | 1/1968 | Manasia et al. | 260—18 |

DONALD E. CZAJA, Primary Examiner

D. J. BARRACK, Assistant Examiner

U.S. Cl. X.R.

117—21; 260—18, 37, 41, 836, 837, 857